July 6, 1943.
S. CIPULLO
2,323,516
GEAR SHIFT MECHANISM
Filed Oct. 13, 1941
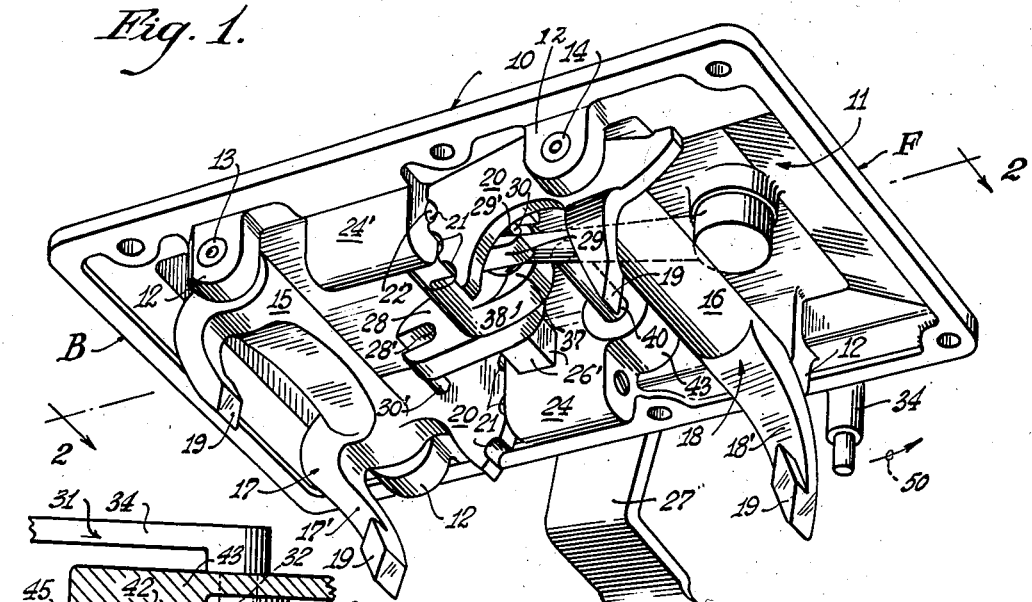
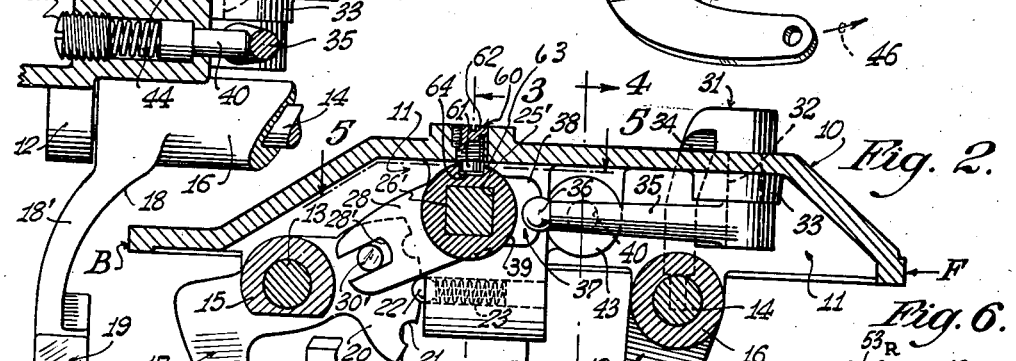
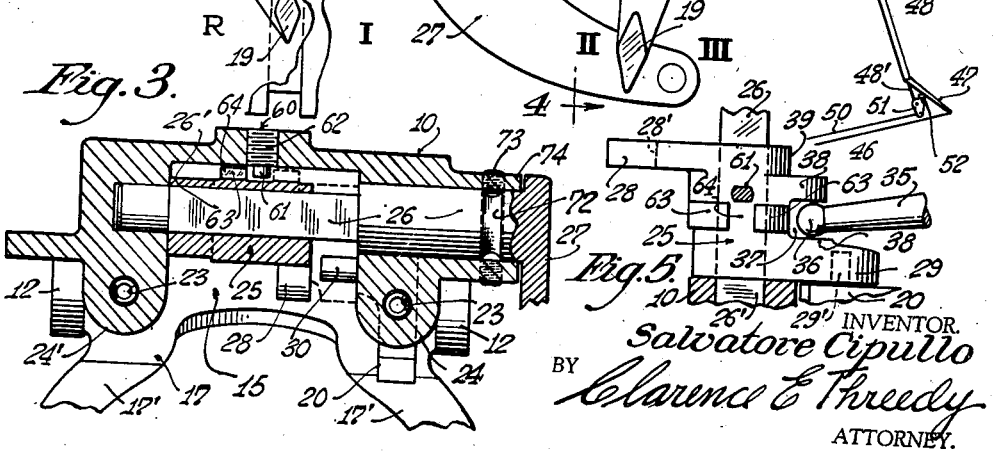
INVENTOR.
Salvatore Cipullo
BY Clarence E. Threedy
ATTORNEY.

Patented July 6, 1943

2,323,516

UNITED STATES PATENT OFFICE 2,323,516

GEARSHIFT MECHANISM

Salvatore Cipullo, Chicago, Ill.

Application October 13, 1941, Serial No. 414,770

4 Claims. (Cl. 74—473)

This invention relates to improvements in mechanical gear shifting devices, particularly suited for use in automotive vehicles, and has for one of its principal objects the provision of gear shift mechanism adapted for operation by a small hand lever positioned on a steering post of the vehicle, the shifting mechanism being further adapted for cooperation with standard transmission gear sets.

Another object is the provision of gear shift mechanism of a unitary structure carried in a cover member which may be substituted for the ordinary cover member of transmission gear set housings to adapt the gear set thereof for operation by manual shifting levers arranged on the steering post of the vehicle.

Another and further object of this invention is to provide a combination of mechanism, hereinafter described, which is compact in assembly and will occupy, when thus assembled, a relatively small amount of space, all of which is essentially desirable from the standpoint of convenience and manufacture.

A further object is the provision of a gear shift mechanism of compact construction having leverage means for shifting transmission gears with the slightest effort exerted on the hand control.

A still further object of the invention is the provision of a gear shift mechanism including as a mounting base, a cover plate adapted for attachment to the top of the transmission gear set to replace the ordinary cover plate, a plurality of shifting yokes arranged for rocking movement in cooperative engagement with the usual transmission gears, a sliding selecting sleeve arranged to alternately engage and disengage the individual shifting yokes, and an operating crank for shifting the sliding and selecting sleeve as aforesaid responsive to manipulation of a hand lever.

Other objects and advantages of the invention reside in certain details of construction, operation and arrangement of parts hereinafter described in view of the drawing in which Fig. 1 is a perspective view of the gear shift mechanism as seen from the under side of the cover or the base member thereof;

Fig. 2 is a longitudinal vertical section of the gear shift mechanism as seen along lines 2—2 in Fig. 1;

Fig. 3 is a fragmentary cross section along the main control shaft of the device as seen along lines 3—3 in Fig. 2;

Fig. 4 is a fragmentary sectional detail view taken substantially along lines 4—4 of Fig. 2;

Fig. 5 is a fragmentary plan view, partly in section, of the main control unit, as seen from line 5—5 in Fig. 3; and Fig. 6 is a diagrammatic illustration of one form of control means with which the present invention may be associated.

Referring to Fig. 1, 10 indicates a cover plate which forms a base or foundation for the gear shifting mechanism. The cover 10 is of a uniform size so as to fit over standard transmission gear set mechanisms, and is provided with a shallow recess 11 to limit the amount of head room required to fit the new unit into standard vehicles.

Adjacent each end of the plate 10 the latter is provided with pairs of axial spaced arms 12 constituting trunnion cradles. The trunnion cradle adjacent the back edge B of the cover plate 10 supports a cross shaft 13, and the trunnion cradle adjacent the front edge F supports a similar shaft 14 upon each of which shafts are loosely carried for swinging action the sleeve portions 15 and 16 respectively of yoke members, one of which is designated 17 and the other 18. Each of these yoke members 17 and 18 provides lever arms 17' and 18' respectively extending radially from the corresponding sleeve portion, each arm being provided at its free end with inward extending cam members 19 which are adapted to fit into operative engagement with corresponding shiftable transmission gears.

Each of the sleeve members 15 and 16 is provided with a radially extending segmental portion 20 having a peripheral edge portion in which are formed a plurality of suitably spaced notches 21 adapted to receive detent members such as ball bearings 22 which are urged outwardly along a line disposed radially from the respective cross shaft 13 or 14 by a coil spring 23 arranged in a bore provided in depending bosses 24 and 24' formed on the under side of the cover plate. The balls 22 constitute detents which are operable to effect swing action of the several rocking sleeves into various selected positions corresponding to certain gear speeds selected by operation of the hand lever under the control of the driver.

Means for selectively actuating the gear shift yokes includes the provision of a sliding selecting sleeve 25 mounted for sliding movement transversely of the cover plate on a rocker shaft 26. The shaft 26 is supported for rocking action in the upper area of the bosses 24 and 24' and has a crank arm 27 fixed to its one end exteriorly of the cover 10. The shaft 26 is provided with an annular slot 72 and is normally held in the cover plate by means of a pin 73 extending through the mounting boss 74 adjacent the boss 24 in such a manner as to permit rotative movement of the shaft 26 but prevent longitudinal movement thereof. That portion of the shaft 26 which spans the bosses 24 and 24' is square in cross section. The selecting sleeve 25 has an opening 25' formed therein which coacts with the flattened surfaces 26' on the shaft 26 to provide a key whereby the selecting sleeve 25 will be rotatable with the shaft 26 as well as being shiftable with respect to the axis of the latter.

The selecting sleeve 25 is provided at each of its end portions with a radially extending arm. One of these radially extending arms adjacent the boss 24 is referred to as arm 28, while the opposite one of these arms is designated 29. Each of the arms 28 and 29 has a bifurcation 28' and 29' respectively, formed in its end portion.

The yokes 17 and 18 are normally positioned as shown in Fig. 3 when the gear set mechanism is in a neutral position. Under such normal condition the arm 29 of the selecting sleeve 25 will be positioned with its bifurcation 29' in engagement with a pin 30 extending laterally from the extension 20 formed as a part of the yoke 18. While the selecting sleeve 25 is operatively engaged with the yoke 18 as aforesaid, it is particularly noted that the yoke 17 is out of operative engagement with the selecting sleeve 25 as seen in Fig. 3, and that when the member 25 is moved to the right as seen in Fig. 3, the bifurcation on arm 28 will slide into operative engagement with a pin 30' extending laterally from the radial extension 20 formed as a part of the sleeve 15 of yoke 17.

Means for accomplishing a sliding movement of the selecting sleeve 25 is provided by a lever mechanism generally indicated at 31 which comprises a vertically disposed shaft 32 supported in a boss 33 provided in the upper wall of the cover plate 10 and having a lever arm 34 fixed to the top end thereof exteriorly of the cover plate. The lower end of the shaft 32 has a lever arm 35 fixed thereto beneath the top wall of the cover plate 10 and this lever arm 35 is adapted to swing with the shaft when the outside lever arm 34 is oscillated. The free end of the lever arm 35 has a ball formation 36 thereon which is disposed in a trackway 37 provided by a pair of rib members 38 extending radially from the side wall 39 of the selecting sleeve 25, one of the ribs 38 being formed as a part of the arm 29.

As seen in Figs. 1 and 4, the lever arm 35 is urged into normal position by a pin 40 slidably arranged in a bore 42 provided in a boss 43 formed as a part of the cover plate 10. The pin 40 is urged into normal extended position as seen in Fig. 4 by a compression spring 44 disposed in the bore 42 and enclosed in the latter by a stud screw 45 which is adjustable from the exterior of the cover plate.

In use the present invention is connected to steering post gear shift control means of any one of a number of well-known types, one of which is illustrated diagrammatically in Fig. 6. The arm 27 is linked through a connecting rod 46 with the main shifting lever 47 which is adapted to swing horizontally as indicated by the arrows, when a shaft 48 upon which it is arranged is rocked by manipulation of a handle or gear shift lever 49. The lever 34 is linked by a connecting rod 50 to a suitable bell crank 51 pivoted as at 52 on some stationary part of the vehicle frame. The lower end of a shaft 48' having pivotal connection with one leg of the bell crank 51 whereby when the gear shift lever 49 is rocked vertically on a horizontal swinging connection 53 by manipulation of the lever 49 in the direction of the vertical arrow, the shaft 48' will be depressed against the action of a spring 54 to swing the bell crank 51 in a counter-clockwise direction about its pivot 52.

The gear shift lever 49 is normally positioned in the H-shaped guide centrally between second and third gear positions by reason of the compression spring 44 and pin 40 associated therewith urging the lever arm 35 into the position shown in Fig. 1. When shifting the transmission gear set into first speed condition, the driver of the vehicle lifts the lever 49 into the track provided for first and reverse speed conditions. Such movement of the operating control mechanism will through bell crank 51 draw the lever 34 to the right, in Figs. 1 and 2, thereby swinging shaft 32 and lever arm 35 against the action of the compression spring 44 and pin 40. Such swinging action of the lever arm 35 will cause the ball head 36 thereof by reason of its engagement in the trackway 37 to slide the shifting sleeve 25 toward the right (Fig. 3) whereupon the bifurcated end 29' of lever arm 29 will become disengaged with respect to the pin 30 of the yoke 18 and the bifurcated end 28' of the lever arm 28 will become engaged with the pin 30' of the yoke 17. The next step in shifting into first speed requires the lever 49 to be swung horizontally clockwise (Fig. 6) whereupon the shaft 48 and lever 47 will likewise swing clockwise to transmit such motion through rod 46 to lever 27 to swing the latter and the shaft 26 with which it is associated, clockwise as seen in Fig. 2. The shifting sleeve 25 being keyed to shaft 26 will likewise swing clockwise and through lever 28 which as it will be recalled is engaged with the pin 30', will cause the yoke 17 to swing in a counter-clockwise direction whereby the cam members 19 disposed in the conventional annular groove formed in the transmission gear set mechanism will cause the latter to slide into first speed condition. It will be noted that upon movement of either yoke 17 or 18 into one of the respective speed positions the respective yoke member will assume the particular position in a snap-like action by reason of the ball detent falling into notch 21 on the radially extending arm 20 of the yoke member.

When shifting from first speed to second speed the lever arm 49 is swung back into centermost condition to return yoke 17 to neutral position and by reason of the action of the spring 54 and of the coil spring 44 and pin 40 pressing against lever arm 35, the latter together with lever arm 34 will be snapped back into a neutral condition with the lever arm 29 of the shifting sleeve 25 in operative engagement with the lateral extending pin 30 of the yoke 18. The handle 49 will then be swung in a counter-clockwise direction (Fig. 5) to swing shaft 48, lever 47, and through link 46, lever 27 and shaft 26 in a counter-clockwise direction to swing the shift sleeve 25 and lever arm 29 thereof counterclockwise. The counterclockwise swing of the lever 29 will, through pin 30 cause the yoke 18 to swing clockwise and assume a position whereby the cam members 19 thereof will shift the gear set mechanism with which it is associated into second speed condition.

In shifting from second to third speed the lever 49 is swung in a clockwise direction past neutral position and into third position of the H form guide whereupon linkage 48, 47, and 46 will swing the lever 27 clockwise to rotate shaft 26 and shifting sleeve 25 therewith. Such clockwise rotation of the shifting sleeve 25 will cause the lever arm 29 thereof to rock the yoke 18 in a counterclockwise direction into the position shown in Fig. 1 wherein the ball detent 22 is in engagement with the uppermost recess 21 in the radial extending flange 20 of the yoke 18. The last named movement of the yoke 18 will cause the latter to slide the gear set mechanism with which it is associated into third speed condition.

In connection with the present disclosure it is pointed out that the yoke members are a single unitary structure which rock on their respective supporting shafts. The cam members 19 are formed as an integral part of the leg portions of the yokes and are of a substantial elliptical or diamond shape so as to permit a swinging action in the conventional annular grooves G of the gear set mechanism with which they are associated so as to prevent any binding action between the cams and the side walls of the aforementioned annular grooves.

As is well-known in this art, the shifting action into either first speed or reversed speed is usually more likely to cause difficulty when being moved in the meshing condition. In this connection it is pointed out that the yoke member 17 is provided with arms 17' of a "dog leg" shape. The particular form of leg members 17' having been found most advantageous in conjunction with conventional gear set mechanisms to eliminate the possibility of the yoke member coming into engagement with rotating gear mechanisms of the gear sets, and to provide a means to support the cam members 19 thereof in substantial radial alignment with swing of said yoke.

In order to prevent rocking operation of the shifting sleeve 25 while the latter is in the course of being shifted from one of its extreme positions to the other, there is provided a stop means 60. This stop means comprises a detent 61 extending from a plug 62 fixedly arranged in the top wall of the cover plate 10 (Fig. 2). The selecting sleeve 25 has a rib 63 formed thereon in its central area (Figs. 3 and 5) and this rib is cut away as at 64 to provide a passage. In the course of shifting the sleeve 25 along the shaft 26 there obviously can be no rocking movement imparted to the sleeve 25 by reason of the fact that the detent 61 is in abutting relation with respect to the walls of the passage 64 formed in the rib 63. It is also apparent that there cannot be any shifting movement imparted to the sleeve 25 while the latter is in either of its two extreme positions by reason of the fact that the rib 63 will abut, at its sides, the detent 61 and will only permit shifting movement of the sleeve 25 when the latter is in normal or central position wherein it is adapted to immediately engage a pin 30 opposite to the one it is about to disengage.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a device of the class described, a cover plate having a relatively shallow recess portion, a rockable shaft supported by said cover plate within said shallow recess portion, a shifting sleeve on said shaft, said sleeve on said shaft having means slidably keying the sleeve to said shaft and provided with a pair of bifurcated members, shaft supporting means adjacent each end of said plate and depending from said cover a relatively short distance therebeneath in the form of a pair of trunnion cradles, a shaft member extending transversely beneath the plate in each of said trunnion cradles, a shifting yoke rockably mounted on each of a corresponding one of said transversely extending shaft members and including pin members adapted to engage in the bifurcation of said bifurcated members, means for yieldably urging the bifurcation of one of said bifurcated members into engagement with one of said pin members, and manually shiftable means for shifting said sleeve against action of said yieldable means to dispose the bifurcation of the other one of said bifurcated members into engagement with the pin member of the opposite shifting yoke, and means for rocking said shaft for imparting rockable motion to either of said yokes when the pin of either of said yokes is disposed in the bifurcation of its respective bifurcated member.

2. In a device of the class described, a cover plate having a relatively shallow recess portion, a rockable shaft supported by said cover plate within said shallow recess portion, a shifting sleeve on said shaft, said sleeve on said shaft having means slidably keying the sleeve to said shaft and provided with a pair of bifurcated members, shaft supporting means adjacent each end of said plate and depending from said cover a relatively short distance therebeneath and forming a pair of trunnion members, a shaft member extending transversely beneath the plate in each of said trunnion members, a shifting yoke rockably mounted on each of said transversely extending shaft members and including pin members adapted to engage in the bifurcation of said bifurcated members, means for yieldably urging the bifurcation of one of said bifurcated members into engagement with one of said pin members, and manually shiftable means for shifting said sleeve against action of said yieldable means to dispose the bifurcation of the other of said pin members into engagement with the bifurcation of the opposite shifting yoke, and means for rocking said shaft for imparting rockable motion to either of said yokes when the pin of either of said yokes is in engagement with the bifurcation of its respective bifurcated portions, said shifting yokes each having a portion provided with equally spaced notches and resilient means adapted to selectively engage in said notches.

3. In a device of the class described, a cover plate having a relatively shallow recess portion, a rockable shaft supported by said cover plate within said shallow recess portion, a shifting sleeve on said shaft, said sleeve on said shaft having means slidably keying the sleeve to said shaft and provided with a pair of bifurcated members, shaft supporting means adjacent each end of said plate and depending from said cover a relatively short distance therebeneath and forming a pair of trunnion members, a shaft member extending transversely beneath the plate in each of said trunnion members, a shifting yoke rockably mounted on each of a corresponding one of said transversely extending shafts on opposite sides of said rockable shaft equidistantly spaced therefrom and including pin members adapted to engage in the bifurcation of said bifurcated members, means for yieldably urging said sleeve in one direction to dispose the bifurcation of one of said bifurcated members in engagement with its corresponding pin member, and manually shiftable means for shifting said sleeve against action of said yieldable means to dispose the bifurcation of the other of said bifurcated members into engagement with the pin member of the opposite shifting yoke, and means for rocking said shaft for imparting rockable motion to either of said yokes when the pin of either of said yokes is engaged with the bifurcation of said bifurcated portions.

4. In a device of the class described, a cover plate having a relatively shallow recess portion, a rockable shaft supported by said cover plate within said shallow recess portion, a shifting sleeve on said shaft, said sleeve on said shaft having means slidably keying the sleeve to said shaft and provided with a pair of bifurcated members, shaft supporting means depending from said cover a relatively short distance therebeneath and forming a pair of trunnion members, a shaft member extending transversely beneath the plate in each of said trunnion members, a shifting yoke rockably mounted on a corresponding one of said transversely extending shafts on opposite sides of said rockable shaft and equidistantly spaced therefrom and including pin members adapted to engage in the bifurcation of said bifurcated members, means for yieldably urging said sleeve in one direction to dispose the bifurcation of one of said bifurcated members in engagement with the pin member adjacent thereto, and manually shiftable means for shifting said sleeve against action of said yieldable means to dispose the bifurcation of the other of said bifurcated members into engagement with the pin member of the opposite shifting yoke, and means for rocking said shaft for imparting rockable motion to either of said yokes when the pin of either of said yokes is engaged with the bifurcation of said bifurcated portions, said shifting yokes each having a portion provided with equally spaced notches and resilient means adapted to selectively engage in said notches.

SALVATORE CIPULLO.